US012033658B2

(12) United States Patent
Matsui et al.

(10) Patent No.: US 12,033,658 B2
(45) Date of Patent: Jul. 9, 2024

(54) ACOUSTIC MODEL LEARNING APPARATUS, ACOUSTIC MODEL LEARNING METHOD, AND PROGRAM

(71) Applicant: NIPPON TELEGRAPH AND TELEPHONE CORPORATION, Tokyo (JP)

(72) Inventors: Kiyoaki Matsui, Tokyo (JP); Takafumi Moriya, Tokyo (JP); Takaaki Fukutomi, Tokyo (JP); Yusuke Shinohara, Tokyo (JP); Yoshikazu Yamaguchi, Tokyo (JP); Manabu Okamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 409 days.

(21) Appl. No.: 17/428,274

(22) PCT Filed: Jan. 23, 2020

(86) PCT No.: PCT/JP2020/002207
§ 371 (c)(1),
(2) Date: Aug. 4, 2021

(87) PCT Pub. No.: WO2020/162190
PCT Pub. Date: Aug. 13, 2020

(65) Prior Publication Data
US 2022/0122626 A1    Apr. 21, 2022

(30) Foreign Application Priority Data
Feb. 5, 2019    (JP) ................. 2019-018478

(51) Int. Cl.
G10L 25/30    (2013.01)
G06N 3/08    (2023.01)
G10L 25/78    (2013.01)

(52) U.S. Cl.
CPC ............... G10L 25/30 (2013.01); G06N 3/08 (2013.01); G10L 25/78 (2013.01); *G10L 2025/783* (2013.01)

(58) Field of Classification Search
CPC ..................................................... G10L 25/30
See application file for complete search history.

(56) References Cited

U.S. PATENT DOCUMENTS

2008/0052075 A1* 2/2008 He ................... G10L 15/063
704/256
2019/0244604 A1* 8/2019 Masataki ............ G10L 15/183

OTHER PUBLICATIONS

Bengio et al. (2009) "Curriculum Learning" Proceedings of the 26th annual international conference on machine learning, ACM, Jun. 14, 2009.

(Continued)

*Primary Examiner* — Thomas H Maung

(57) ABSTRACT

Provided is a technology of learning an acoustic model with a certain degree of accuracy of sound recognition within a short calculation period. An acoustic model learning device includes: a loss calculation unit configured to calculate a loss of sound data which is an element of the corpus $C_j$ for learning by using an acoustic model; a curriculum corpus generation unit configured to generate a curriculum corpus being a union of subsets of the corpuses $C_j$ for learning, the corpuses $C_j$ including, as elements, sound data for which the loss falls within a predetermined range indicating a small value; an acoustic model update unit configured to update the acoustic model by using the curriculum corpus; and a first end condition determination unit configured to output the acoustic model when a predetermined end condition is (Continued)

satisfied, or transfer execution control to the loss calculation unit when the predetermined end condition is not satisfied, and the acoustic model update unit is configured to update the acoustic model by giving a weight to a gradient for sound data which is an element of the curriculum corpus using such a weight for sound data as to have a smaller value as a number of times the sound data has been selected as an element of the curriculum corpus becomes larger.

6 Claims, 6 Drawing Sheets

(56) References Cited

OTHER PUBLICATIONS

Kumar et al. (2010) "Self-Paced Learning for Latent Variable Models" Advances in Neural Information Processing Systems, NIPS, Dec. 6, 2010.

Jiang et al. (2014) "Self-Paced Learning with Diversity" Advances in Neural Information Processing Systems, Dec. 8, 2014.

\* cited by examiner

ACOUSTIC MODEL LEARNING APPARATUS, ACOUSTIC MODEL LEARNING METHOD, AND PROGRAM

CROSS-REFERENCE TO RELATED APPLICATIONS

This application is a U.S. 371 Application of International Patent Application No. PCT/JP2020/002207, filed on 23 Jan. 2020, which application claims priority to and the benefit of JP Application No. 2019-018478, filed on 5 Feb. 2019, the disclosures of which are hereby incorporated herein by reference in their entireties.

TECHNICAL FIELD

The present invention relates to a technology of learning an acoustic model in sound recognition.

BACKGROUND ART

In recent years, a technology using deep neural networks (DNN) has been widely used when sound recognition is put into practical use. A method using curriculum learning described in NPL 1 is known as a method of stably learning an acoustic model by using the DNN. In curriculum learning, for example, various kinds of training data are classified into some classes by clustering based on a degree of difficulty in learning the training data, and learning is executed preferentially for training data to be learned easily. In curriculum learning, training data with an appropriate difficulty is learned at an appropriate timing, and thus curriculum learning is effective for learning such a model as to adapt to a plurality of environments at the same time.

Various kinds of techniques for curriculum learning are currently proposed. For example, self-paced learning (SPL) described in NPL 2 is a technique of automatically acquiring a curriculum for learning. Further, there is also a technique called "self-paced learning with diversity" (SPLD) (NPL 3), which reflects the viewpoint of diversity in SPL.

Now, a description is given of learning of an acoustic model based on SPLD. In learning of an acoustic model based on SPLD, the acoustic model is learned by using a plurality of corpuses for learning in accordance with the following procedure.
(1) A loss of sound data, which is an element of a corpus for learning, is calculated by using an acoustic model acquired at the current time point for all the corpuses for learning. The loss refers to a value of a loss function representing the degree of correctness of an output acquired from sound data by using an acoustic model.
(2) For each corpus for learning, pieces of sound data, which are elements of the corpus for learning, are sorted in ascending order of loss (namely, ascending sorting).
(3) Sound data with a loss equal to or smaller than (or strictly smaller than) a predetermined threshold value is selected as training data. The following expression can be used for the threshold value, for example.

$$thr_i = \lambda + \gamma \frac{1}{\sqrt{i} + \sqrt{i-1}} \quad (1)$$

In the above expression, λ and γ represent constants. λ may also be called "age weight", and γ may also be called "variety weight". Further, i represents an order given by ascending sorting in each corpus for learning, which is assigned to sound data. Thus, i represents an integer equal to or larger than one.

The constants λ and γ have the following properties. The constant λ has such a property that as the value becomes larger, sound data with a larger loss (namely, sound data difficult to learn) is selected as training data. Further, the constant γ has such a property that as the value becomes larger, sound data is likely to be selected widely from among a plurality of corpuses for learning.
(4) The sound data selected in (3) is integrated into one corpus, and the corpus is used to learn an acoustic model.
(5) The processing of from (1) to (4) is repeated.

CITATION LIST

Non Patent Literature

[NPL 1] Y. Bengio, et al., "Curriculum Learning", Proceedings of the 26th annual international conference on machine learning, ACM, 2009.
[NPL 2] M. Pawan Kumar, Benjamin Packer, Daphne Koller, "Self-paced Learning for Latent Variable Models", Advances in Neural Information Processing Systems, pp. 1189-1197, 2010.
[NPL 3] L. Jiang, et al., "Self-paced Learning with Diversity", Advances in Neural Information Processing Systems, 2014.

SUMMARY OF THE INVENTION

Technical Problem

As can be understood from learning of an acoustic model based on SPLD described above, learning of an acoustic model based on curriculum learning has the following problems. (problem 1) Sound data with a larger loss, namely, sound data with a high degree of difficulty in learning is selected as training data at a later stage of a learning process, and thus the number of times such sound data is used for learning an acoustic model decreases, with the result that such sound data may not be sufficiently learned before learning is finished.

In other words, learning may be finished without sufficiently using sound data with a high degree of difficulty in learning, and thus in learning of an acoustic model based on curriculum learning, an acoustic model with a certain degree of accuracy of sound recognition may not be learned.

In view of the above, the present invention has an object to provide a technology of learning an acoustic model with a certain degree of accuracy of sound recognition within a short calculation period.

Means for Solving the Problem

According to one aspect of the present invention, there is provided an acoustic model learning device, including: a loss calculation unit configured to calculate, for a corpus $C_j$ (j=1, ..., J) for learning, a loss of sound data, which is an element of the corpus $C_j$ (j=1, ..., J) for learning, by using an acoustic model θ, where J represents an integer equal to or larger than one and the corpus $C_j$ (j=1, ..., J) for learning represents a set of sound data; a curriculum corpus generation unit configured to generate a curriculum corpus C being a union of subsets of the corpuses $C_j$ (j=1, ..., J) for learning, which include, as elements, sound data for which the loss falls within a predetermined range indicating a small value; an acoustic model update unit configured to update the acoustic model θ by using the curriculum corpus C; and a first end condition determination unit configured to output the acoustic model θ when a predetermined end condition is satisfied, or transfer execution control to the loss calculation unit when the predetermined end condition is not satisfied, in which the acoustic model update unit is configured to update the acoustic model θ by giving a weight to a gradient for sound data, which is an element of the curriculum corpus C, using such a weight w for sound data as to have a smaller value as a number of times n the sound data has been selected as an element of the curriculum corpus becomes larger.

According to one aspect of the present invention, there is provided an acoustic model learning device, including: a loss calculation unit configured to calculate, for a corpus $C_j$ (j=1, ..., J) for learning, a loss of sound data, which is an element of the corpus $C_j$ (j=1, ..., J) for learning, by using an initial acoustic model aa; being an initial value of the acoustic model θ, where J represents an integer equal to or larger than one and the corpus $C_j$ (j=1, ..., J) for learning represents a set of sound data; a curriculum corpus generation unit configured to generate a curriculum corpus C being a union of subsets of the corpuses $C_j$ (j=1, ..., J) for learning, the corpuses $C_j$ (j=1, ..., J) including, as elements, sound data for which the loss falls within a predetermined range indicating a small value; an acoustic model update unit configured to update the acoustic model θ by using the curriculum corpus C; and a first end condition determination unit configured to output the acoustic model θ when a predetermined end condition is satisfied, or transfer execution control to the loss calculation unit when the predetermined end condition is not satisfied, in which the acoustic model update unit is configured to update the acoustic model θ by giving a weight to a gradient for sound data, which is an element of the curriculum corpus C, using such a weight w for sound data as to have a smaller value as a number of times n the sound data has been selected as an element of the curriculum corpus becomes larger.

Effects of the Invention

According to the present invention, it is possible to learn an acoustic model with a certain degree of accuracy of sound recognition within a short calculation period.

DESCRIPTION OF EMBODIMENTS

Figure 1:
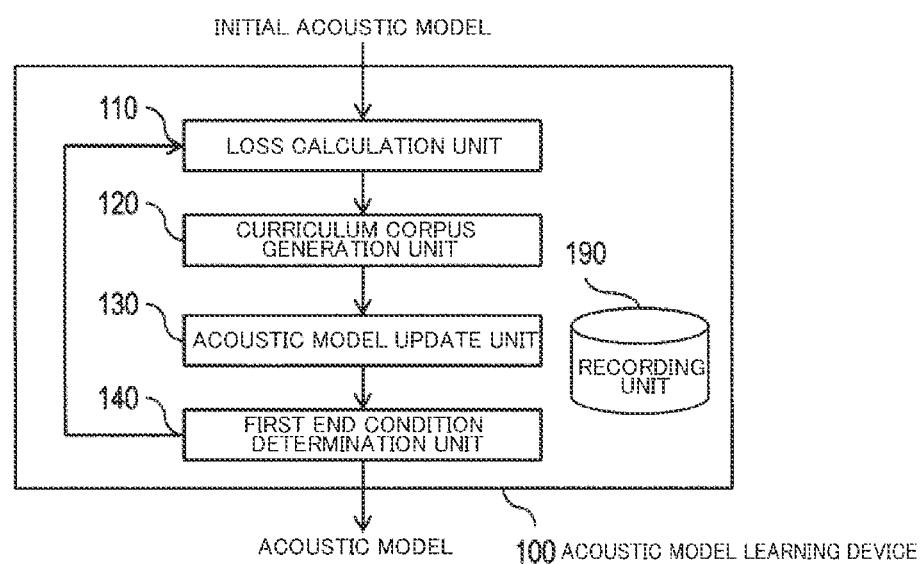
FIG. 1 is a diagram illustrating an example of a configuration of an acoustic model learning device 100.

Now, a description is given in detail of an embodiment of the present invention. A functional unit having the same function is assigned with the same reference numeral, and a redundant description thereof is omitted.

Technical Background

In order to solve the problem 1 described above, in gradient calculation processing for updating a parameter of an acoustic model, such a weight for sound data as to have a smaller value as the number of times the sound data has been used for learning, which is counted for each piece of sound data, becomes larger, is used to give a weight to the gradient for the sound data. With this processing, in update of a parameter, it is possible to relatively increase the influence of sound data used for learning for the first time while at the same time relatively decreasing the influence of sound data used for learning repeatedly.

First Embodiment

The acoustic model learning device 100 learns an acoustic model θ by using a corpus $C_j$ (j=1, ..., J, J is an integer equal to or larger than one) for learning, which is a set of sound data. At this time, the acoustic model learning device 100 uses an initial acoustic model $θ_{ini}$, which is an initial value of the acoustic model θ, to start learning. The initial acoustic model $θ_{ini}$ refers to a learned acoustic model, which is learned in advance by a DNN using a corpus with a certain degree of size. The phrase "certain degree of size" refers to an amount (e.g., sound data equivalent to about 100 hours) that is generally considered to be sufficient for DNN learning. Further, the corpus $C_j$ (j=1, ..., J) for learning is a set of sound data generated by classifying sound data by clustering based on a predetermined criterion. The criterion for clustering is, for example, an utterance task (e.g., short utterance and natural utterance), an utterance environment (e.g., presence or absence of echo or noise, type of echo or noise, or strength of echo or noise), a sound bandwidth, or speaker information (e.g., gender, age, or dialect).

Figure 2:
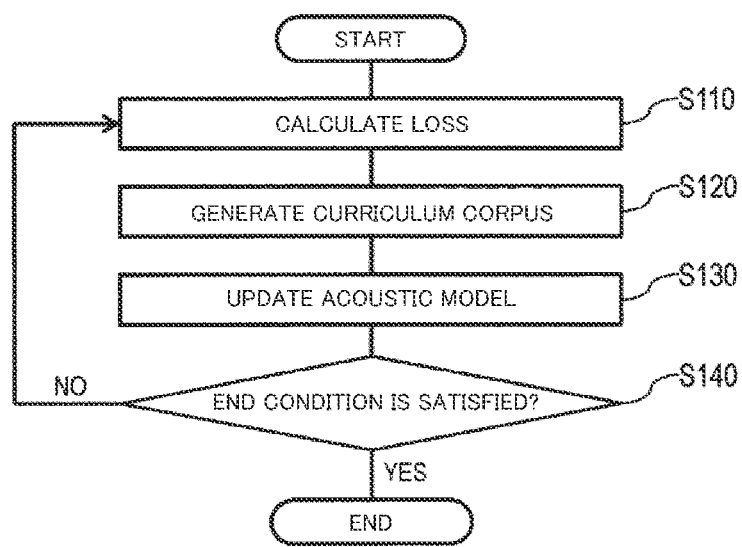
FIG. 2 is a diagram illustrating an example of an operation of the acoustic model learning device 100.

Now, a description is given of the acoustic model learning device 100 with reference to FIG. 1 and FIG. 2. As illustrated in FIG. 1, the acoustic model learning device 100 includes a loss calculation unit 110, a curriculum corpus generation unit 120, an acoustic model update unit 130, a first end condition determination unit 140, and a recording unit 190. The recording unit 190 is a component configured to appropriately record information necessary for processing of the acoustic model learning device 100. The recording unit 190 records the corpus $C_j$ (j=1, ..., J) for learning and the acoustic model θ, for example.

Now, a description is given of an operation of the acoustic model learning device 100 with reference to FIG. 2.

In S110, the loss calculation unit 110 inputs the corpus $C_j$ (j=1, ..., J) for learning, calculates, for the corpus $C_j$ (j=1, ..., J) for learning, a loss of sound data, which is an element of the corpus $C_j$ (j=1, ..., J) for learning, by using the acoustic model θ, and outputs the loss. The loss refers to a value of a loss function representing the degree of correctness of an output acquired from sound data by using an acoustic model. Further, the initial acoustic model $θ_{ini}$ is used in the initial processing of the loss calculation unit 110, but the acoustic model θ during learning is used in the second and subsequent processing.

In S120, the curriculum corpus generation unit 120 inputs the corpus $C_j$ (j=1, ..., J) for learning and the loss calculated in S110. Then, the curriculum corpus generation unit 120 generates a curriculum corpus C being a union of subsets of the corpuses $C_j$ (j=1, ..., J) for learning, which include sound data described below as elements, and outputs the curriculum corpus C. The sound data refers to sound data for which the calculated loss falls within a predetermined range indicating a small value. The phrase "loss falls within a predetermined range indicating a small value" refers to any one of a situation in which the loss is equal to or smaller than a predetermined threshold value, or a situation in which the loss is smaller than the predetermined threshold value. Further, the curriculum corpus generation unit 120 updates sound data (namely, sound data being an element of the curriculum corpus C) used for generating the curriculum corpus C so that the number of times n the sound data has been selected as an element of the curriculum corpus is incremented by one. Zero is set as the initial value of the number of times n for all the pieces of sound data.

Now, a description is given of a procedure of generating the curriculum corpus C based on SPLD by the curriculum corpus generation unit 120. The SPLD is only one example, and the curriculum corpus generation unit 120 may generate a curriculum corpus based on curriculum learning other than the SPLD.

(1) The curriculum corpus generation unit 120 sorts, for each corpus $C_j$ (j=1, . . . , J) for learning, pieces of sound data, which are elements of the corpus $C_j$ for learning, in ascending order of loss.

(2) The curriculum corpus generation unit 120 selects, for each corpus $C_j$ (j=1, . . . , J) for learning, sound data with a loss equal to or smaller than (or strictly smaller than) a predetermined threshold value as training data. In other words, the curriculum corpus generation unit 120 adds the sound data as an element of a subset of the corpus $C_j$ for learning forming the curriculum corpus C. Further, the number of times n the sound data has been selected as an element of the curriculum corpus is updated and recorded. When sound data with a smaller loss is compared with a threshold value in order, pieces of sound data, which are elements of the corpus $C_j$ for learning, are sorted in an ascending order, and thus the comparison processing can be finished when data with a loss larger than (or equal to or larger than) the threshold value has appeared.

(3) The curriculum corpus generation unit 120 integrates the subsets, which is crated in (2), of the corpuses $C_j$ for learning, which include, as elements, sound data for which the loss is equal to or smaller than (or strictly smaller than) the predetermined threshold value, into one corpus, to thereby generate the curriculum corpus C. Therefore, the curriculum corpus C is a union of subsets of the corpuses $C_j$ (j=1, . . . , J) for learning.

The above-mentioned numerical expression (1) can be used for defining the threshold value. The constants $\lambda$ and $\gamma$ in the numerical expression (1) may be gradually set to be larger every time the number of times of generation of a curriculum corpus is increased. With this, as the values of the constants $\lambda$ and $\gamma$ become larger, a threshold value $thr_i$ also becomes larger, with the result that sound data with a large loss can be included in the curriculum corpus as the training data. Therefore, it is possible to gradually increase the amount of data to be used for learning by increasing the amount of sound data with a high degree of difficulty in learning. The constants $\lambda$ and $\gamma$ may be given to the acoustic model learning device 100 from the outside.

Figure 3:
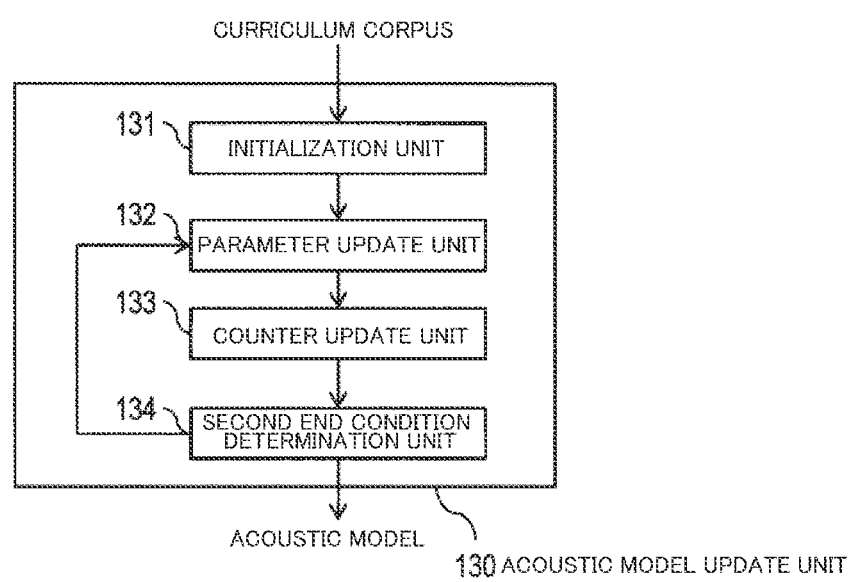
FIG. 3 is a diagram illustrating an example of a configuration of an acoustic model update unit 130.
Figure 4:
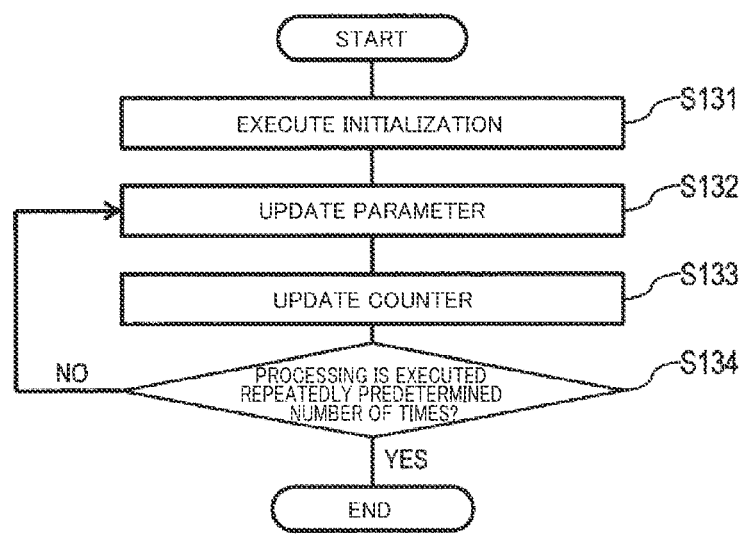
FIG. 4 is a diagram illustrating an example of an operation of the acoustic model update unit 130.

In S130, the acoustic model update unit 130 inputs the curriculum corpus C generated in S120, updates the acoustic model $\theta$ by using the curriculum corpus C generated in S120, and outputs the acoustic model $\theta$. Publicly known DNN learning such as stochastic gradient descent (SGD) can be used for updating the acoustic model, for example. Now, a description is given of the acoustic model update unit 130 with reference to FIG. 3 and FIG. 4. FIG. 3 is a block diagram illustrating a configuration of the acoustic model update unit 130. FIG. 4 is a flow chart illustrating an operation of the acoustic model update unit 130. As illustrated in FIG. 3, the acoustic model update unit 130 includes an initialization unit 131, a parameter update unit 132, a counter update unit 133, and a second end condition determination unit 134.

Now, a description is given of an operation of the acoustic model update unit 130 with reference to FIG. 4.

In S131, the initialization unit 131 initializes a counter t. Specifically, the initialization unit 131 sets t=1.

In S132, the parameter update unit 132 updates the parameter of the acoustic model $\theta$ by using the curriculum corpus C. Now, a description is given of parameter update processing based on SGD.

(1) A random patch is generated by using the curriculum corpus C. The random patch refers to a subset of the curriculum corpus C, which is obtained by randomly selecting sound data being an element of the curriculum corpus C.

(2) A loss is calculated for sound data being an element of the random batch.

(3) A gradient for sound data is calculated by using the loss calculated in (2), and the gradient is multiplied by a weight w to obtain a definitive gradient. The weight w for sound data to be used has a smaller value as the number of times n the sound data has been selected as an element of the curriculum corpus becomes larger. For example, it is conceivable to adopt a method of defining the weight w for sound data as 1/n.

However, this method causes the tendency of the loss of the entire training data to become smaller rapidly as selection of training data is repeated, and thus there is a concern for convergence without sufficient learning. In order to solve this concern, the number of times of generation of the curriculum corpus is considered to be used to suppress overall gradual decrease of the loss. That is, m is set as the number of times of generation of the curriculum corpus, a is set as a predetermined constant, and am/n is set as the weight w for sound data instead of 1/n. $\alpha$ represents a constant for adjusting the magnitude of the weight w. $\alpha$ may take any real number, but learning fails when the value of $\alpha$ is large. Thus, it is necessary to set $\alpha$ as an appropriate value in accordance with the learning condition. m/n takes a value equal to or larger than one, and thus it is desirable to set $\alpha$ as a real number smaller than one.

Now, a description is given of several examples of $\alpha$. For example, $\alpha=1$ may be set when a weight for sound data selected first at the time of starting learning is not adjusted, and sound data selected next or later is given a weight. Further, $\alpha=0.5$ may be set when it is desired to keep a balance between suppression of contribution of sound data selected again and again repeatedly and emphasis of contribution of sound data selected relatively at a later stage, considering that sound data selected first at the time of starting learning takes a value of m/n=1. In this case, the average value of the entire loss also becomes stable, and thus there is an advantage in that convergence of learning is not interfered. Therefore, in actuality, it is considered to be desirable to set $\alpha=0.5$ as the initial value, and determine a by appropriately adjusting a in accordance with the learning condition (characteristic of learning).

(4) The parameter is updated based on the gradient calculated in (3).

As can be understood from (3) and (4), such a weight W for sound data as to have a smaller value as the number of times n the sound data has been selected as an element of the curriculum corpus becomes larger is obtained. Then, the weight W is used to give a weight to the gradient for the sound data, which is an element of the curriculum corpus C, and update the acoustic model θ.

In S133, the counter update unit 133 increments the counter t by one. Specifically, t←t+1 is set.

In S134, when the counter t has reached a predetermined update count T (T is an integer equal to or larger than one) (that is, when t>T is satisfied to satisfy the end condition), the second end condition determination unit 134 outputs the acoustic model θ at that time, and finishes the processing. Otherwise, the processing returns to the processing of S132. That is, the acoustic model update unit 130 repeats the processing of from S132 to S134.

The update count T is desired to be set to be a smaller value than an update count in a case where learning of an acoustic model based on SDG is executed alone. This is because when learning of an acoustic model based on SDG is executed alone, learning is executed until convergence based on a fixed corpus to be used for learning, whereas the acoustic model update unit 130 is only a component of the acoustic model learning device 100, and the acoustic model update unit 130 executes learning a plurality of number of times while at the same time repeatedly updating the curriculum corpus.

In S140, when a predetermined end condition is satisfied, the first end condition determination unit 140 outputs the acoustic model θ and finishes the processing. On the other hand, when the predetermined end condition is not satisfied, the first end condition determination unit 140 transfers execution control to the loss calculation unit 110 (return to processing of S110). That is, the acoustic model learning device 100 repeats the processing of from S110 to S140. The predetermined end condition to be used may be a condition of whether or not the counter s has reached a predetermined update count S (S is an integer equal to or larger than one). In this case, S is an upper limit of the number of times m of generation of the curriculum corpus. Further, the predetermined end condition may be whether or not a frame accuracy, which is calculated by using the acoustic model θ for a validation corpus prepared in advance, is improved. In this case, the first end condition determination unit 140 may check whether or not the frame accuracy is improved. When the frame accuracy is not improved, the first end condition determination unit 140 may output the acoustic model θ and finish the processing, whereas when the frame accuracy is improved, the first end condition determination unit 140 may return to the processing of S110.

According to the invention of this embodiment, it is possible to learn an acoustic model with a certain degree of accuracy of sound recognition within a short calculation period. Such a weight w for sound data as to have a smaller value as the number of times n the sound data has been selected as an element of the curriculum corpus becomes larger is obtained. Then, the weight W is used to learn the acoustic model θ. With this, it is possible to execute learning that puts relatively high emphasis on sound data with a high degree of difficulty in learning at a later stage of a learning process, and execute learning of an acoustic model with a certain degree of accuracy of sound recognition within a short calculation period.

Second Embodiment

The acoustic model learning device 100 calculates losses for all the pieces of sound data, which are elements of the corpus $C_j$ (j=1, . . . , J) for learning, every time the acoustic model θ is updated. This adversely affects the learning efficiency, and negatively influences learning of an acoustic model with a certain degree of accuracy of sound recognition within a short calculation period (problem 2).

In order to solve the problem 2 described above, a loss is calculated only once. According to an experiment, even when a loss is calculated every time a curriculum corpus is generated, there is little influence on the convergence speed of learning, although a specific numerical value is not shown here. Meanwhile, it is necessary to calculate a loss by using an acoustic model for all the pieces of sound data included in all the corpuses for learning, resulting in an enormous amount of time for that calculation. Therefore, even when a loss is calculated only once, it is possible to greatly reduce the calculation period without negatively influencing learning.

Figure 5:
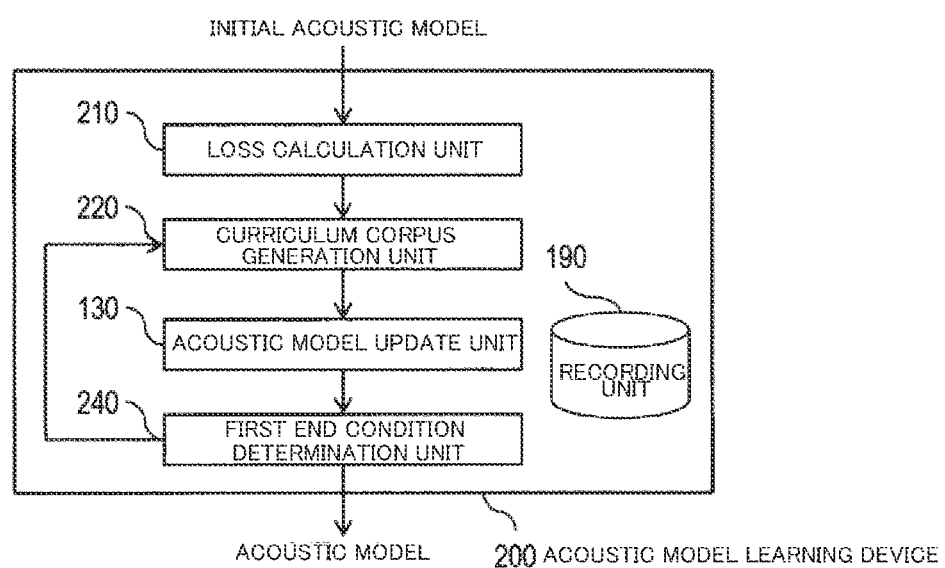
FIG. 5 is a diagram illustrating an example of a configuration of an acoustic model learning device 200.

Now, a description is given of the acoustic model learning device 200 configured to calculate a loss only once. Now, a description is given of the acoustic model learning device 200 with reference to FIG. 5 and FIG. 6. As illustrated in FIG. 5, the acoustic model learning device 200 includes a loss calculation unit 210, a curriculum corpus generation unit 220, the acoustic model update unit 130, a first end condition determination unit 240, and the recording unit 190. The recording unit 190 is a component configured to appropriately record information necessary for processing of the acoustic model learning device 200. The recording unit 190 records the corpus $C_j$ (j=1, . . . , J) for learning and the acoustic model θ, for example.

Figure 6:
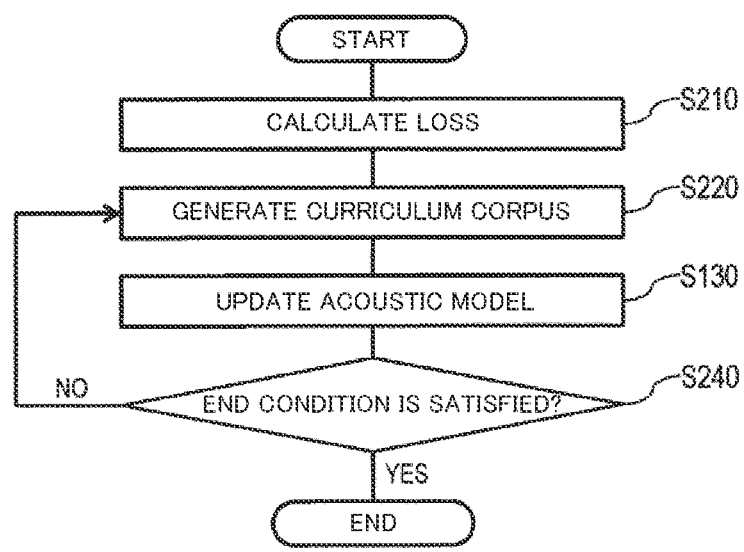
FIG. 6 is a diagram illustrating an example of an operation of the acoustic model learning device 200.

Now, a description is given of an operation of the acoustic model learning device 200 with reference to FIG. 6.

In S210, the loss calculation unit 210 inputs the corpus $C_j$ (j=1, . . . , J) for learning, calculates a loss of sound data, which is an element of the corpus $C_j$ (j=1, . . . , J) for learning, by using the initial acoustic model $θ_{ini}$, which is an initial value of the acoustic model θ, and outputs the loss.

In S220, the curriculum corpus generation unit 220 inputs the corpus $C_j$ (j=1, . . . , J) for learning and the loss calculated in S210. Then, the curriculum corpus generation unit 220 generates and outputs the curriculum corpus C described below. The curriculum corpus C refers to a union of subsets of the corpuses $C_j$ (j=1, . . . , J) for learning, which include, as elements, sound data for which the loss calculated in S210 falls within a predetermined range indicating a small value. Further, the curriculum corpus generation unit 220 updates, for sound data used for generating the curriculum corpus C, the number of times n the sound data has been selected as an element of the curriculum corpus by increasing the number of times n by one. The sound data refers to sound data being an element of the curriculum corpus C. The procedure of generating the curriculum corpus C by the curriculum corpus generation unit 220 may be similar to that of the curriculum corpus generation unit 120.

In S130, the acoustic model update unit 130 inputs the curriculum corpus C generated in S220, updates the acoustic model θ by using the curriculum corpus C generated in S220, and outputs the acoustic model θ.

In S240, when a predetermined end condition is satisfied, the first end condition determination unit 240 outputs the acoustic model θ, and finishes the processing. On the other hand, when the predetermined end condition is not satisfied, the first end condition determination unit 240 transfers execution control to the curriculum corpus generation unit 220 (return to processing of S220). That is, the acoustic model learning device 200 repeats the processing of from S220 to S240. The predetermined end condition used by the first end condition determination unit 240 may be similar to that of the first end condition determination unit 140.

According to the invention of this embodiment, it is possible to learn an acoustic model with a certain degree of accuracy of sound recognition within a short calculation period. It is possible to remove the necessity of a period for calculating a loss and execute learning within a smaller calculation period by using the loss calculated through use of the acoustic model without calculating the loss every time a curriculum corpus is generated.

<Supplementary Note>

The device according to this invention includes, as one hardware entity, for example, an input unit to which a keyboard or the like can be connected, an output unit to which a liquid crystal display or the like can be connected, a communication unit to which a communication device (e.g., communication cable) capable of communicating with the outside of the hardware entity can be connected, a central processing unit (CPU, which may include a cache memory or a register, for example), a RAM or ROM being a memory, an external storage device being a hard disk, and a bus connecting the input unit, the output unit, the communication unit, the CPU, the RAM, the ROM, and the external storage device to one another so as to enable exchange of data. Further, as the necessity arises, a device (drive) capable of reading/writing data from/to a storage medium such as a CD-ROM may be provided in the hardware entity. A physical entity including such hardware resources is, for example, a general computer.

The external storage device of the hardware entity stores, for example, a program necessary for implementing the above-mentioned function and data necessary for processing of this program (instead of the external storage device, a ROM being a read-only storage device may store the program, for example). Further, data or the like obtained by processing of the program is appropriately stored in a RAM or external storage device, for example.

In the hardware entity, each program stored in the external storage device (or ROM or the like) and data necessary for processing of each program are read into the memory as necessary, and are appropriately interpreted, executed, and processed by the CPU. As a result, the CPU implements a predetermined function (each component represented by unit, means, or the like in the above description).

The present invention is not limited to the above-mentioned embodiments, and can be modified appropriately without departing from the gist of the present invention. Further, the processing described in the above-mentioned embodiments may not always be executed chronologically in order of description, but may be executed in parallel or individually depending on the necessity or the processing capability of a device configured to execute processing.

As described above, when a computer implements the processing functions of the hardware entity (device according to present invention) described in the above-mentioned embodiments, the details of processing of functions to be included in the hardware entity are described in a program. Then, the computer executes the program, so that the processing functions of the hardware entity are implemented on the computer.

The program describing the details of processing can be recorded in a computer-readable storage medium. The computer-readable storage medium may be, for example, any medium such as a magnetic storage device, an optical disc, a magneto-optical recording medium, or a semiconductor memory. Specifically, for example, a hard disk drive, a flexible disk, a magnetic tape, or the like can be used as the magnetic storage device. A digital versatile disc (DVD), a DVD-random access memory (RAM), a compact disc read only memory (CD-ROM), a CD-recordable (R)/rewritable (RW), or the like can be used as the optical disc. A magneto-optical disk or the like can be used as the magneto-optical recording medium. An electronically erasable and programmable-read only memory (EEP-ROM) or the like can be used as the semiconductor memory.

Further, the program is distributed by, for example, selling, transferring, or lending a portable storage medium such as a DVD or CD-ROM recording the program. Further, a configuration may be adopted, in which the program is stored in a storage device of a server computer, and the program is distributed by transferring the program from the server computer to other computers.

A computer that executes such a program first temporarily stores, into an own recording device, a program recorded in the portable storage medium or a program transferred from the server computer, for example. Then, at the time of execution of processing, the computer reads the program stored in the own recording device, and executes processing in accordance with the read program. Further, as another execution mode of the program, the computer may directly read a program from the portable storage medium, and execute processing in accordance with the program. Further, every time the server computer transfers a program to the computer, the computer may sequentially execute processing in accordance with the received program. Further, the server computer may not transfer a program to the computer, but may be configured to execute the above-mentioned processing by a so-called application service provider (ASP) service, which implements processing functions by simply giving an execution command and obtaining a result. The program in this mode is information to be provided for processing by an electronic computational machine, and includes data (e.g., data with property specifying processing of a computer without directly giving a command to the computer) equivalent to a program.

Further, in this mode, the hardware entity is configured by executing a predetermined program on a computer. However, at least a part of details of the processing may be implemented by hardware.

Description of the above-mentioned embodiments of the present invention is given for the purpose of exemplification and description. The description is not intended to be exhaustive, and the invention is not intended to be limited to the exact disclosed format. Modification or variation can be made based on the above-mentioned teaching. The embodiments are selected and represented to provide most appropriate exemplification of the principle of the present invention, and to enable a person skilled in the art to use the present invention in the form of various embodiments or by adding various modifications thereto so as to adapt to considered actual usage. All such modifications and variations fall within the scope of the present invention defined by the appended claims interpreted in accordance with a range given fairly, legally, and equally.

The invention claimed is:

1. An acoustic model learning device, comprising:
    a loss generator configured to determine, for a corpus $C_j$ (j=1, ..., J) for learning, a loss of sound data which is an element of the corpus $C_j$ (j=1, ..., J) for learning by using an acoustic model $\theta$, where J represents an integer equal to or larger than one and the corpus $C_j$ (j=1, ..., J) for learning represents a set of sound data;
    a curriculum corpus generator configured to generate a curriculum corpus C being a union of subsets of the corpuses $C_j$ (j=1, ..., J) for learning, the corpuses $C_j$ (j=1, ..., J) including, as elements, sound data for which the loss falls within a predetermined range indicating a small value;

the curriculum corpus generator configured to update sound data used for generating the curriculum corpus C so that the number of times η sound data has been selected as an element of the curriculum corpus C is updated by incrementing by one;

an acoustic model updater configured to update the acoustic model θ by using the curriculum corpus C; and a first end condition determination unit configured to output the acoustic model θ when a predetermined end condition is satisfied, or transfer execution control to the loss generator when the predetermined end condition is not satisfied, wherein the acoustic model updater is configured to update the acoustic model θ by giving a weight to a gradient for sound data which is an element of the curriculum corpus C using such a weight w for sound data as to have a smaller value as a number of times n the sound data has been selected as an element of the curriculum corpus becomes larger.

2. The acoustic model learning device according to claim 1, wherein the weight w for sound data is represented by am/n where m represents a number of times of generation of the curriculum corpus and a represents a predetermined constant.

3. An acoustic model learning device, comprising:

a loss generator configured to generate, for a corpus $C_j$ (j=1, ..., J) for learning, a loss of sound data which is an element of the corpus $C_j$ (j=1, ..., J) for learning by using an initial acoustic model $\theta_{ini}$ being an initial value of the acoustic model θ, where J represents an integer equal to or larger than one and the corpus $C_j$ (j=1, ..., J) for learning represents a set of sound data;

a curriculum corpus generator configured to generate a curriculum corpus C being a union of subsets of the corpuses $C_j$ (j=1, ..., J) for learning, the corpuses $C_j$ (j=1, ..., J) including, as elements, sound data for which the loss falls within a predetermined range indicating a small value;

the curriculum corpus generator configured to update sound data used for generating the curriculum corpus C so that the number of times 11 sound data has been selected as an element of the curriculum corpus C is updated by incrementing by one;

an acoustic model updater configured to update the acoustic model θ by using the curriculum corpus C; and a first end condition determination unit configured to output the acoustic model θ when a predetermined end condition is satisfied, or transfer execution control to the loss generator when the predetermined end condition is not satisfied, wherein the acoustic model updater is configured to update the acoustic model θ by giving a weight to a gradient for sound data which is an element of the curriculum corpus C using such a weight w for sound data as to have a smaller value as a number of times n the sound data has been selected as an element of the curriculum corpus becomes larger.

4. The acoustic model learning device according to claim 3, wherein the weight w for sound data is represented by αm/n where m represents a number of times of generation of the curriculum corpus and a represents a predetermined constant.

5. An acoustic model learning method, comprising:

calculating, by an acoustic model learning device, for a corpus $C_j$ (j=1, ..., J) for learning, a loss of sound data which is an element of the corpus $C_j$ (j=1, ..., J) for learning by using an acoustic model θ, where J represents an integer equal to or larger than one and the corpus $C_j$ (j=1, ..., J) for learning represents a set of sound data;

updating sound data used for generating the curriculum corpus C so that the number of times η sound data has been selected as an element of the curriculum corpus C is updated by incrementing by one;

generating, by the acoustic model learning device, a curriculum corpus C being a union of subsets of the corpuses $C_j$ (j=1, ..., J) for learning, the corpuses $C_j$ (j=1, ..., J) including, as elements, sound data for which the loss falls within a predetermined range indicating a small value; an acoustic model update step of updating, by the acoustic model learning device, the acoustic model θ by using the curriculum corpus C; and providing, by the acoustic model learning device, the acoustic model θ when a predetermined end condition is satisfied, or transferring, by the acoustic model learning device, execution control to the loss calculation step when the predetermined end condition is not satisfied, wherein the acoustic model update step includes updating the acoustic model θ by giving a weight to a gradient for sound data which is an element of the curriculum corpus C using such a weight w for sound data as to have a smaller value as a number of times n the sound data has been selected as an element of the curriculum corpus becomes larger.

6. The acoustic model learning device according to claim 5, wherein the weight w for sound data is represented by αm/n where m represents a number of times of generation of the curriculum corpus and a represents a predetermined constant.

\* \* \* \* \*